(12) United States Patent
Mahling et al.

(10) Patent No.: US 8,172,690 B2
(45) Date of Patent: May 8, 2012

(54) CONSTANT VELOCITY JOINT

(75) Inventors: Andreas Mahling, Müllheim (DE); Frank Scheider, Meckenbeuren (DE)

(73) Assignee: IPA-Technologies GmbH, Haldensleben (DE)

( * ) Notice: Subject to any disclaimer, the term of this patent is extended or adjusted under 35 U.S.C. 154(b) by 321 days.

(21) Appl. No.: 12/386,923

(22) Filed: Apr. 24, 2009

(65) Prior Publication Data

US 2009/0270186 A1   Oct. 29, 2009

(30) Foreign Application Priority Data

Apr. 25, 2008  (DE) .......................... 10 2008 020 848

(51) Int. Cl.
*F16D 3/227*  (2006.01)

(52) U.S. Cl. ......................... 464/146; 464/906
(58) Field of Classification Search .......... 464/144–146, 464/906
See application file for complete search history.

(56) References Cited

U.S. PATENT DOCUMENTS

| 2,313,279 | A | * | 3/1943 | Suczek | 464/146 |
| 3,162,024 | A | * | 12/1964 | Breuer et al. | 464/146 |
| 3,688,521 | A | * | 9/1972 | Smith et al. | 464/146 |
| 6,913,540 | B2 | * | 7/2005 | Iihara et al. | 464/146 X |
| 7,008,327 | B2 | * | 3/2006 | Kuczera et al. | 464/146 |

FOREIGN PATENT DOCUMENTS

| DE | 29 27 648 A1 | * | 1/1981 |
| JP |    5 231436 |   | 9/1993 |

* cited by examiner

*Primary Examiner* — Gregory Binda
(74) *Attorney, Agent, or Firm* — Klaus J. Bach

(57) ABSTRACT

In a constant velocity joint comprising an outer housing ring having an end wall with a journal and an inner surface provided with axially extending ball races and an inner ring member with outer ball races arranged in the outer housing ring and balls disposed in the ball races for the transmission of torque between the outer housing ring and the inner ring member, and a ball cage for retaining the balls in position in the ball races, a support ring is arranged in the housing ring between the end wall of the housing ring and the inner ring member for axially supporting the inner ring member during insertion of a shaft end into the inner ring member of the constant velocity joint.

6 Claims, 1 Drawing Sheet

CONSTANT VELOCITY JOINT

BACKGROUND OF THE INVENTION

The invention resides in a constant velocity joint of monoblock design including an outer ring housing having an endwall with a shaft journal and an inner ring with internal axially extending toothing for accommodating a toothed shaft end and balls disposed in ball races formed between the inner ring outer rings for the transmission of torques between the inner and the outer rings.

A constant velocity joint of monoblock design is known for example from JP 523 1436 A. This joint comprises an outer ring housing provided with an end wall having a journal integrally formed therewith, an inner ring member with an internal toothing for receiving an end of a joint shaft and provided with axially extending ball races formed in the outer ring housing and also in the inner ring member as well as a ball cage for the transfer of torque from the outer ring housing to the inner ring member or vice versa. The ball race at the inner surface of the outer ring housing extends over the full length thereof, that is, from the open front to the end wall of the outer ring housing. The ball cage is axially longer than the inner ring member. A retaining ring is provided for retaining the balls, the ball cage and the inner ring member within the outer ring housing.

A constant velocity joint is a supplier component which is used by a drive shaft manufacturer in the manufacture of drive shafts. However, an immediate completion is not possible since, with an axial insertion of the drive shaft end section, the inner ring, the balls and the ball cage are moved toward the end wall while only the ball cage abuts the end wall. For establishing a press connection between the inner ring member with internal toothing and the end part of the shaft with outer toothing, the axial force applied via the drive shaft needs to be relatively large, whereby however the inner ring member is being pushed through the ball cage and could be damaged or destroyed in the process. In practice therefore, in a first step the constant velocity joint is removed, in a second step the inner ring member with internal toothing is mounted, with a press-fit, onto the end part of the drive shaft, in a third step, the inner ring member, the balls and the ball cage are inserted into outer ring housing and, in a fourth step, are retained therein by the installation of a retaining ring. The disassembly and re-assembly of the constant velocity joint however is time-consuming and, furthermore, may be the source of failures, for example, by failing to install one of the balls into the universal joint.

It is therefore the object of the present invention to provide a universal joint which facilitates the installation thereof into a driveshaft.

SUMMARY OF THE INVENTION

In a constant velocity joint comprising an outer housing ring having an end wall with a journal and an inner surface provided with axially extending ball races and an inner ring member with outer ball races arranged in the outer housing ring and balls disposed in the ball races for the transmission of torque between the outer housing ring and the inner ring member, and a ball cage for retaining the balls in position in the ball races, a support ring is arranged in the housing ring between the end wall of the housing ring and the inner ring member for axially supporting the inner ring member during insertion of a shaft end into the inner ring member of the constant velocity joint.

In this way, the disassembly and re-assembly of the constant velocity during the manufacture of the drive shaft can be avoided since the constant velocity joint is supplied with the support ring already installed. Noticeable cost savings are achieved thereby.

In the outer ring housing, the support ring may be held in position in a force- or form-locking manner. It may also be cemented in place or, for example, secured by means of a rivet. The support ring is a cylindrical body with an annular circumferential flange formed integrally with the cylindrical body. The cylindrical body has a smaller diameter than the ball cage. At each of its axial ends, the cylindrical body is provided with an engagement surface. It consists for example of plastic and is of simple design so that its low manufacturing costs are essentially immaterial in comparison with the costs of the constant velocity joint itself. During operation of the drive shaft, the support ring remains in the constant velocity joint but without any function.

The invention will become more readily apparent from the following description of an exemplary embodiment thereof on the basis of the accompanying drawings.

DESCRIPTION OF A PARTICULAR EMBODIMENT

Figure 1:
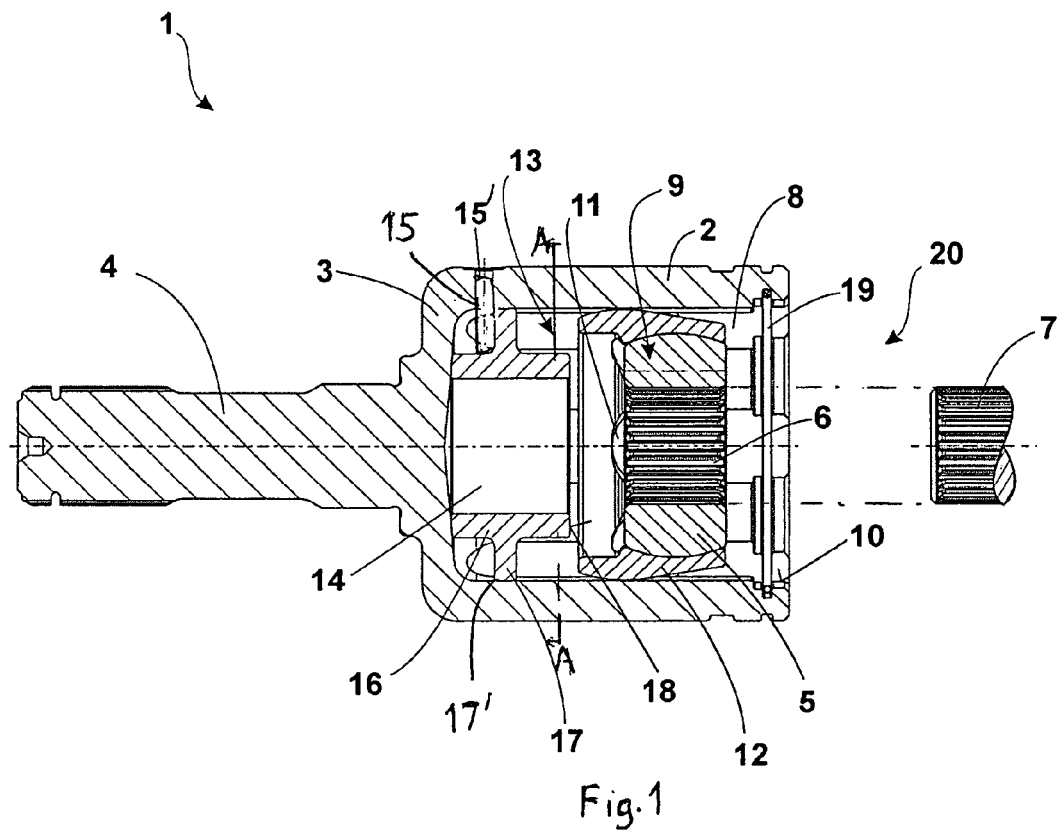
FIG. 1 is a cross-sectional view of a constant velocity joint according to the invention.
Figure 2:
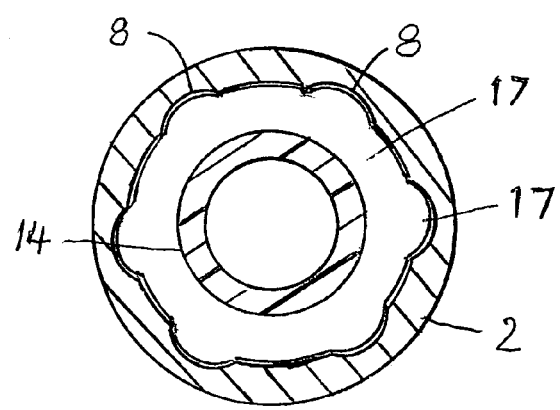
FIG. 2 is a cross-sectional view taken along line A-A of FIG. 1.

The figure shows a constant velocity joint 1 in the form of a monoblock design including an outer housing ring 2 provided with an end wall 3 and a shaft journal 4 integrally formed therewith co-axially with the outer housing ring 2. Further components of the constant velocity joint 1 are an internal ring member 5 with an internal toothing 6, balls 11, a ball cage 12 and a retaining ring 19. In the inner surface 10 of the outer housing ring 2 axially extending ball races 8 are formed. These ball races 8 extend from an open front end 20 of the housing ring 2 up to the end wall 3 of the constant velocity joint. Corresponding to the ball races 8 in the outer housing ring 2 ball races 9 are provided in the outer surface of the inner ring element 5. The balls 11 are axially guided in the ball races and torques are transmitted from the inner ring member 5 to the outer housing ring 2 or vice versa. The inner ring member 5, the balls 11 as well as the ball cage 12 are retained in the outer housing ring 2 so that they cannot be unintentionally pulled out of the outer housing ring 2.

In accordance with the invention, a support ring 14, which may consist for example of plastic, is disposed in a space 13 in the outer housing ring 2. The space 13 corresponds to the space remaining between the end wall 3 and the inner ring member 5. During the manufacture of the constant velocity joint, the support ring 14 is the first component that is inserted into the outer housing ring 2. The support ring 14 consists of a cylindrical base body 16 and an annular flange 17 which is integrally formed with the base body 16. The base body 16 has a smaller diameter than the ball cage 12. The outer circumference of the support ring 14 abuts the inner surface 10 of the outer housing ring 2. The engagement may be achieved by force- or form-locking means. Of course, the support ring 14 may also be cemented into the outer ring housing 2. in an alternative embodiment, the outer housing ring 2 includes a radial through bore 15 in which a fixing element 15' is disposed for holding the support ring 14 in position. The fixing element 15' may be for example a rivet or a screw. The flange 17 may also be provided with radially extending noses 17' via which the support ring 14 is guided in the ball races 8 of the outer housing ring 2.

During completion of the drive shaft by installation of the constant velocity joint 1, the end 7 of the drive shaft provided with the outer toothing is inserted axially into the inner ring member 4 which is provided with the internal toothing. In this process, the inner ring member 5, the balls 11 and the ball cage 12 are moved inwardly toward the end wall 3 until the inner ring member 5 abuts the support surface 18 of the support ring 14. Since the support ring 14 at the same time abuts the end wall 3, further axial displacement of the inner ring member 5 is prevented. Then, the force applied to the shaft end part 7 can be increased until a secure compression connection between shaft end part 7 and the inner ring member 5 is established. At this point, the mounting procedure is completed. During operation of the drive shaft the support ring 14 has no functionality.

The arrangement according to the invention has the following advantages:

- For the completion of a drive shaft with the constant velocity joint only a single assembly step is required whereby manufacturing time and efforts are minimized
- With the omission of the previous need for the disassembly and re-assembly of the constant velocity joint, sources of errors are avoided;
- The support ring is a simple inexpensive lightweight part which can remain in the constant velocity joint for the life of the constant velocity joint.

What is claimed is:

1. A constant velocity joint comprising:

an outer housing ring (2) provided, at an axial end thereof, with an end wall (3) having a journal (1) integrally formed thereon, the outer housing ring (2) having an inner surface (10) provided with axially extending ball races (8), an inner ring member (5) having an outer surface provided with a axially extending ball races (9) and being disposed within the outer housing ring (2) such that the ball races (9) of the inner ring member (5) are disposed adjacent respective ball races (8) of the outer housing ring (2), bails (11) disposed in the bail races (8, 9) formed between the inner ring member (5) and the outer housing ring (2) for the transfer of torques between the outer housing ring (2) and the inner ring member (5), the inner ring member (5) being provided with internal toothing (6) for accommodating a toothed shaft end (7), a ball cage (12) for retaining the balls (11) in position in the ball races (8,9) and a support ring (14) arranged in the outer housing ring (2) between the end wall (3) thereof and the inner ring member (5) and abutting the inner surface (10) of the outer housing ring (2) over the circumference thereof and the end wall (3) of the outer housing ring (2) for axially supporting the inner ring member (5) on the end wall (3) of the constant velocity joint (1) during installation of the toothed shaft end (7) into the inner ring member (5).

2. The constant velocity joint according to claim 1, wherein the support ring (14) is disposed in the outer housing ring (2) by one of a force fitting connection, a form-fitting connection and a cement connection.

3. The constant velocity joint according to claim 1, wherein the outer housing ring (2) includes a radial bore (15) in which a fixing element 15' is installed for holding the support ring (14) in position.

4. The constant velocity joint according to claim 1, wherein the support ring (14) comprises a cylindrical base body (16) with a circumferential flange (17) integrally formed therewith, the cylindrical base body (16) having a smaller diameter than the ball cage (12).

5. The constant velocity joint according to claim 4, wherein the cylindrical base body (16) is provided at its axially opposite ends with engagement surfaces (18).

6. The constant velocity joint according to claim 5, wherein the circumferential flange (17) includes radial noses (17') which are accommodated in the ball races (8) of the outer housing ring (2).

* * * * *

UNITED STATES PATENT AND TRADEMARK OFFICE
CERTIFICATE OF CORRECTION

PATENT NO. : 8,172,690 B2  Page 1 of 1
APPLICATION NO. : 12/386923
DATED : May 8, 2012
INVENTOR(S) : Mahling et al.

It is certified that error appears in the above-identified patent and that said Letters Patent is hereby corrected as shown below:

On the title page item (73),

Should read: --IFA Technologies GmbH--

Signed and Sealed this
Sixteenth Day of October, 2012

David J. Kappos
*Director of the United States Patent and Trademark Office*